(12) United States Patent
Cunge et al.

(10) Patent No.: US 11,554,959 B2
(45) Date of Patent: Jan. 17, 2023

(54) METHOD FOR THE EXFOLIATION OF GRAPHENE

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE GRENOBLE ALPES, Saint Martin D'Heres (FR)

(72) Inventors: Gilles Cunge, Fontaine (FR); Alexandra Davydova, Grenoble (FR); Emilie Despiau-Pujo, Grenoble (FR); Djawhar Ferrah, Irvine, CA (US); Olivier Renault, Meylan (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE GRENOBLES ALPES, Saint Martin D'Heres (FR)

( * ) Notice: Subject to any disclaimer, the term of this patent is extended or adjusted under 35 U.S.C. 154(b) by 656 days.

(21) Appl. No.: 16/349,966

(22) PCT Filed: Nov. 21, 2017

(86) PCT No.: PCT/EP2017/079854
§ 371 (c)(1),
(2) Date: May 14, 2019

(87) PCT Pub. No.: WO2018/099759
PCT Pub. Date: Jun. 7, 2018

(65) Prior Publication Data
US 2019/0276317 A1 Sep. 12, 2019

(30) Foreign Application Priority Data

Nov. 30, 2016 (FR) ...................... 1661699

(51) Int. Cl.
*B32B 9/00* (2006.01)
*C01B 32/19* (2017.01)
(Continued)

(52) U.S. Cl.
CPC ............ *C01B 32/19* (2017.08); *C01B 32/194* (2017.08); *B82Y 30/00* (2013.01); *C01B 2204/00* (2013.01);
(Continued)

(58) Field of Classification Search
CPC ....... Y10T 428/30; B82Y 30/00; B82Y 40/00; B32B 9/007; C01B 31/04; C01B 32/194
(Continued)

(56) References Cited

U.S. PATENT DOCUMENTS

2010/0074835 A1* 3/2010 Mercuri ................ C01B 32/154
423/448
2016/0207291 A1* 7/2016 Dimitrakopoulos .... B32B 38/10

OTHER PUBLICATIONS

Aspar, et al., "Basic mechanisms involved in the Smart-Cut® process", Microelectronic Engineering, vol. 36, Issues 1-4, pp. 233-240, Jun. 1997.
(Continued)

*Primary Examiner* — Daniel H Miller
(74) *Attorney, Agent, or Firm* — BakerHostetler

(57) ABSTRACT

A process for exfoliating graphene, includes a step of irradiating a first substrate comprising graphene on its surface, with a helium or hydrogen plasma containing ions of energy comprised between 10 and 60 eV. A process for fabricating graphene on the surface of a second substrate, comprising the exfoliating process.

14 Claims, 2 Drawing Sheets

(51) Int. Cl.
    *C01B 32/194* (2017.01)
    *B82Y 30/00* (2011.01)
(52) U.S. Cl.
    CPC ......... *C01B 2204/30* (2013.01); *Y10T 428/30* (2015.01)
(58) Field of Classification Search
    USPC ...................................... 428/408; 423/447.1
    See application file for complete search history.

(56) References Cited

OTHER PUBLICATIONS

Pizzocchero, et al., "Non-destructive electrochemical graphene transfer from reusable thin-film catalysts", ScienceDirect, Carbon 85, pp. 397-405, 2015.

Cunge, et al., "Dry efficient cleaning of poly-methyl-methacrylate residues from graphene with highdensity H2 and H2—N2 plasmas", Journal of Applied Physics, vol. 118, 123302 (2015).
Liang, et al., "Toward Clean and Crackless Transfer of Graphene", vol. 5, No. 11, pp. 9144-9153, 2011.
Eren, et al., "Pure hydrogen low-temperature plasma exposure of HOPG and graphene: Graphane formation?", Beilstein Journal of Nanotechnology, vol. 3, pp. 852-859, 2012.
Luo, et al., "High-precision thickness regulation of graphene layers with low energy helium plasma implantation", Nanotechnology, vol. 23, No. 37, p. 375303, Aug. 24, 2012.
Bangert, et al., "Ion Implantation of Graphene—Toward IC Compatible Technologies", Nano Lett., vol. 13, No. 10, pp. 4902-4907, Oct. 9, 2013.
Hazra, et al., "Thinning of multilayer graphene to monolayer graphene in a plasma environment", Nanotechnology, vol. 22, No. 2, p. 025704, Dec. 8, 2010.
Libo Gao, et al., "Face-to-face transfer of wafer-scale graphene films", Nature, vol. 505, No. 7482, pp. 190-194, Dec. 11, 2013.

\* cited by examiner

METHOD FOR THE EXFOLIATION OF GRAPHENE

CROSS-REFERENCE TO RELATED APPLICATIONS

This application is a National Stage of International patent application PCT/EP2017/079854, filed on Nov. 21, 2017, which claims priority to foreign French patent application No. FR 1661699, filed on Nov. 30, 2016, the disclosures of which are incorporated by reference in their entirety.

FIELD OF THE INVENTION

The field of the invention is that of processes for exfoliating graphene layers.

BACKGROUND

Graphene is an atomic monolayer of $sp^2$ hybridized carbon, and is a promising material that is liable to revolutionize nanotechnologies. To best exploit this material, it is important to be able to transfer it from the substrate on which it has been grown (generally polycrystalline copper) to other types of substrate that in general are insulating. These substrates may be rigid and may typically be so-called high-k oxides. Generally, high-k dielectrics are dielectrics having a high dielectric constant k (compared to that of silicon dioxide). The use of this type of material is one of the development strategies allowing further miniaturization of microelectronic components. These insulating substrates may also be flexible and for example made of polymer.

However, the various demonstrations that have been used to reveal the exceptional physicochemical properties of graphene have been carried out on model samples because transferred graphene is always contaminated or damaged during transfer and loses certain of its principal properties.

Growth by chemical vapor deposition (CVD) and epitaxial growth on SiC allow large areas of graphene of very high crystalline quality to be fabricated. Nevertheless, after growth thereof, so-called CVD graphene must be transferred to other substrates if devices are to be fabricated. This transfer process requires a polymer layer (serving as rigid transfer carrier) to be deposited on the graphene, this being followed by a step aiming to detach the graphene from its growth substrate: the latter step is carried out either by electrochemical processing, or by dissolution of the metal substrate in an acid bath.

In both cases, the graphene-plus-polymer assembly floats on the chemical bath and may then be "fished out" and transferred to the new substrate. This complex procedure is necessary because the forces of adhesion between graphene and copper are stronger than those between graphene and other substrates to which graphene is transferable: direct transfer by "pressing" the graphene (on copper) to the new substrate is therefore impossible.

These technologies for transferring so-called CVD graphene to receiver substrates cause many problems: copper residues on the backside of the graphene, tearing of the graphene and presence of solvent-resistant polymer residues. These problems considerably degrade the electronic properties of the graphene, as described in the article: G. Cunge, D. Ferrah, C. Petit-Etienne, A. Davydova, H. Okuno, D. Kalita, V. Bouchiat and O. Renault, J. Appl. Phys. 118 (12) (2015).

More precisely, the following techniques for transferring so-called CVD graphene from copper to other substrates are known. They all require a rigid polymer carrier to be used and there is a high risk that the graphene will be damaged:

dissolution of the copper in $FeCl_3$ baths or equivalent, described in the article: X. L. Liang, B. A. Sperling, I. Calizo, G. J. Cheng, C. A. Hacker, Q. Zhang, Y. Obeng, K. Yan, H. L. Peng, Q. L. Li, X. X. Zhu, H. Yuan, A. R. H. Walker, Z. F. Liu, L. M. Peng and C. A. Richter, ACS Nano 5 (11), 9144-9153 (2011), this aggressive treatment removes the copper. However, if it is too aggressive, the graphene is damaged or, in the contrary case, copper residues taking the form of particles remain bonded to the graphene. In addition the polymer (or the "thermal release tape") used to rigidify the graphene cannot be perfectly removed once the transfer has been performed;

electrochemistry in particular described in the article: F. Pizzocchero, B. S. Lessen, P. R. Whelan, N. Kostesha, S. Lee, J. D. Buron, I. Petrushina, M. B. Larsen, P. Greenwood, W. J. Cha, K. Teo, P. U. Jepsen, J. Hone, P. Boggild and T. J. Booth, Carbon 85, 397-405 (2015). The electrochemical treatment also uses a thick polymer as rigid transfer carrier. The electrochemical treatment allows $H_2$ gas bubbles to be generated between the copper and graphene. Under the effect of the pressure of the $H_2$, the graphene debonds from the copper and may then be transferred to its receiver substrate. The use of a polymer is indispensable;

the SmartCut technology, in particular described in the article: B. Aspar, M. Bruel, H. Moriceau et al., Microelectronic Engineering, 36 ((1-4)), 233-240 (1997), consists in implanting $H^+$ or $He^+$ ions deeply into an Si substrate. Above a certain dose, the accumulation of ($H_2$, He) gas in the bulk of the substrate at the implantation depth causes it to fracture: the substrate is thus cleaved into two substrates of smaller thicknesses.

It is moreover known and in particular described in the article: W. Luo, J. Xie, C. B. Li, Y. Zhang and Y. Xia, Nanotechnology 23 (37) (2012) that helium plasmas may lead to controlled layer-by-layer etching of graphene though in very high energy ranges not allowing damage to the graphene to be avoided.

In this context, the Applicant has sought a method allowing the forces of cohesion between graphene and its native substrate to be weakened, so as to be able to achieve the exfoliation thereof without running the risk of damage, and thus allowing the growth substrate to be added by direct transfer to other substrates without needing to use either polymers or any chemical baths.

The Applicant has observed that certain conditions of implantation of helium or hydrogen-containing ions through the graphene led to the formation of gas between the graphene and the substrate. Above a certain dose of ions the gas pressure becomes greater than the Van der Waal forces that bind the graphene to the substrate and the entire graphene layer lifts off in one piece (in the same manner as in electrochemical processes, in which debonding is achieved by forming gas at the interface).

This effect is correctly predicted by molecular dynamics (MD) simulations, which treat atoms individually and consist in simulating the impact of Hx+ or He+ ions of well-defined energy on a cell consisting of a group of (substrate+ graphene) atoms. On each impact, the "MD" follows the movement of each atom of the cell by solving Newton's equations (with semiempirical potentials). FIG. 1 for example shows the result of a simulation of implantation of He at 25 eV into a sample of multilayer graphene: He gas is indeed trapped between the two first sheets and the graphene is not damaged. This effect may then advantageously be used in particular to exfoliate CVD graphene from the copper sheets on which it was grown (or even graphene on SiC) or even to etch, layer-by-layer, multilayer graphene.

SUMMARY OF THE INVENTION

More precisely, one subject of the present invention is a process for exfoliating graphene, comprising a step of irradiating a first substrate comprising graphene on its surface, with a helium or hydrogen plasma containing ions of energy comprised between 10 and 60 eV.

Preferably, the helium or hydrogen plasma contains ions of energy comprised between 15 and 30 eV.

According to variants of the invention, the first substrate is conductive or semiconductor.

According to variants of the invention, the substrate is copper or nickel or platinum.

According to variants of the invention, the first substrate is silicon carbide.

According to variants of the invention, the irradiating step is carried out with an inductively coupled plasma (ICP) reactor.

According to variants of the invention, the irradiating step uses a hydrogen or helium gas flow rate comprised between 10 and 1000 sccm (the unit sccm corresponding to one cubic centimeter per minute under the following conditions: a temperature=0° C. i.e. 32° F. and a pressure=101.325 kPa) a pressure comprised between 1 mtorr and 500 mtorr (1 torr being equivalent to about 0.133322 kPa or 1.33322 millibar) and a power comprised between 50 and 2000 W.

According to variants of the invention, the first substrate comprising multilayer graphene, the step of irradiating with a helium or hydrogen plasma containing ions of energy comprised between 10 and 60 eV removes at least the top layer of the multilayer graphene, in the case of layer-by-layer etching of a multilayer sample.

According to variants of the invention, the irradiation is carried out through a mask configured to create graphene patterns.

Another subject of the invention is a process for fabricating graphene on the surface of a second substrate, comprising the exfoliating process according to the invention and comprising:
  a step of adding, to a second substrate, from the first substrate comprising graphene on its surface, said adding step being subsequent to said irradiating step so as to form an assembly comprising graphene located between said first substrate and said second substrate; and removing said first substrate from said assembly.

According to variants of the invention, the process for fabricating graphene on the surface of a second substrate furthermore comprises an operation of pressing said assembly.

According to variants of the invention, the process for fabricating graphene on the surface of a second substrate also comprises a heating operation.

According to variants of the invention, the second substrate is an insulating substrate. It may be rigid, and possibly be a high-k oxide. It may also be supple, and possibly be made of polymer.

BRIEF DESCRIPTION OF THE DRAWINGS

The invention will be better understood and other advantages will become apparent on reading the following non-limiting description which is given with reference to the appended figures, in which.

DETAILED DESCRIPTION

As is known, graphene may be obtained by the CVD technique on a first substrate made of metal, it may conventionally be a question of copper or other transition metals such as transition Ni or Pt.

It is also possible to perform the growth of graphene on a semiconductor substrate, for example a substrate made of SiC, epitaxially.

According to the present invention, the exfoliating process comprises a step allowing the bonds between the graphene and this native first substrate to be weakened in order to obtain graphene intended to be used on another substrate called the second substrate.

To do this, the process of the invention comprises irradiating said first substrate comprising graphene, with a hydrogen or helium plasma able advantageously to be generated in a high-density reactor, possibly an inductively coupled reactor (an ICP reactor for example).

Figure 1:
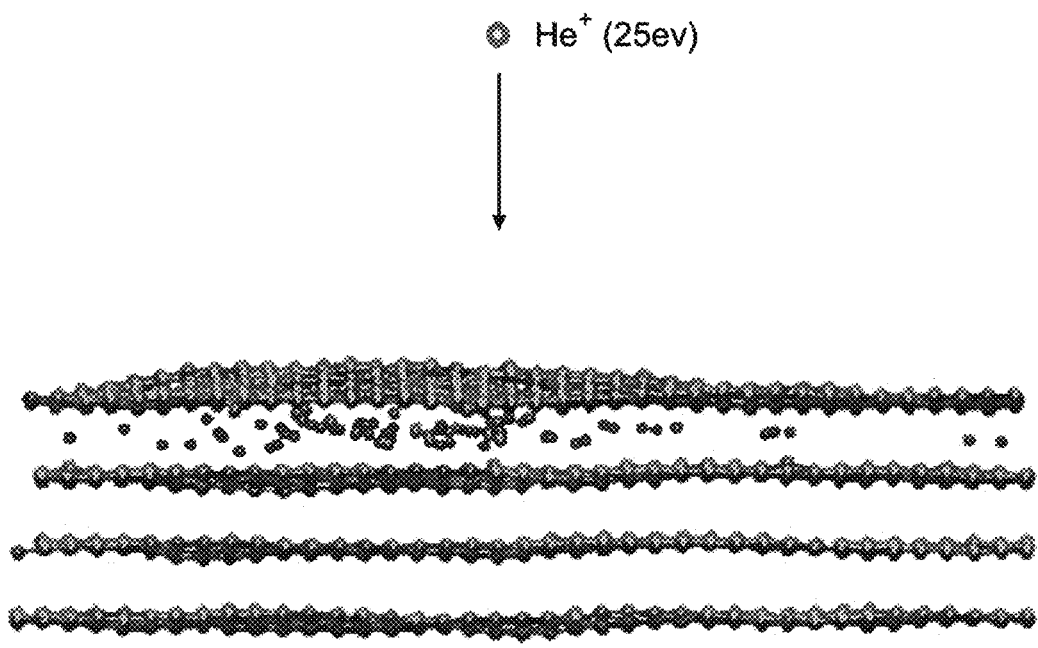
FIG. 1 illustrates the result of a simulation of implantation of He at 25 eV into a sample of multilayer graphene.
Figure 2A:
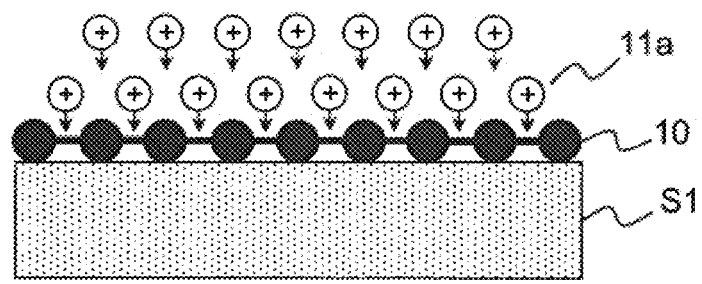
FIGS. 2a to 2d schematically show the steps of a process for fabricating graphene on the surface of a second substrate and comprising the exfoliating process of the present invention.

FIG. 2a thus schematically shows a first step of a process of the invention, illustrating the irradiation by a flux of positive ions 11a of a first substrate $S_1$ comprising graphene 10.

In this type of reactor, an RF electric field is induced in the plasma by an external antenna. It allows high densities to be obtained at low pressure. Depending on the shape of the antenna and its position, ICP reactors may be divided into various types (TPC, DPS, etc.). As regards the most conventional type, a spiral- or circular-shaped antenna is either wound around an insulating tube or is placed flat on the dielectric roof of the reactor: the source. It is there that the plasma is created by the action of the RF magnetic field. The substrate may be placed in a separate chamber located a few tens of centimeters below the source in order to increase the uniformity of the plasma. The energy of the ions may be easily controlled by biasing the substrate with an RF or DC supply operating in continuous-wave or pulsed mode and independent of that of the source.

The base substrate carrying the graphene and denoted first substrate may be conductive and in particular for example made of copper, nonlimitingly.

Generally, when a graphene substrate on a substrate, for example made of copper, is exposed to the plasma, it is bombarded by $He^+$ or $H_x^+$ (x=1-3) ions the energy of which may be controlled in the range 5 eV-2000 eV.

Ions of low energy (lower than 5 eV) rebound from the graphene. Those of higher energy (higher than 60 eV) damage both the graphene (sputter of carbon atoms leading to the formation of voids) and/or pass therethrough in order to be implanted relatively deeply in the copper substrate.

There is however an intermediate energy range (10-60 eV) in which the $H_x^+$ or $He^+$ ions may pass through the graphene without damaging it in order to then be trapped between the graphene and the first substrate (their initial energy allows them to pass through the center of the hexagons of graphene, but once the graphene has been passed through, their energy is no longer sufficient for them to escape and they are trapped).

Thus, $H_2$ gas forms (by recombination of H atoms) or He gas forms in between the first substrate and the graphene:

this gas exerts a pressure that tends to separate the graphene from said first substrate and that therefore weakens the force of cohesion therebetween. As the ion dose increases, the pressure of this intermediate gas also increases, initially leading bubbles to form as described in: B. Eren, D. Hug, L. Marot, R. Pawlak, M. Kisiel, R. Steiner, D. M. Zumbuhl and E. Meyer, Beilstein Journal of Nanotechnology 3, 852-859 (2012), then the entire graphene layer to lift off (in a comparable way to the lift off obtained by electrochemistry).

Figure 2B:
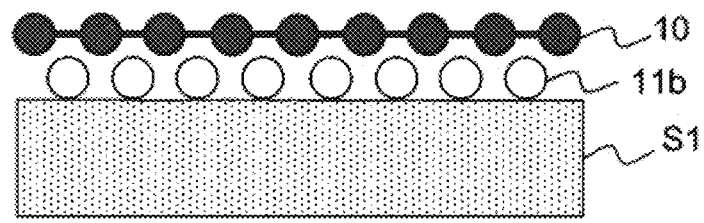

Therefore, by controlling the energy and the dose of the implanted ions it is possible to controllably weaken the forces of cohesion between the graphene and the first substrate. FIG. 2b schematically shows the formation of an intermediate layer of gas 11b between the graphene 10 and the first substrate $S_1$.

Figure 2C:
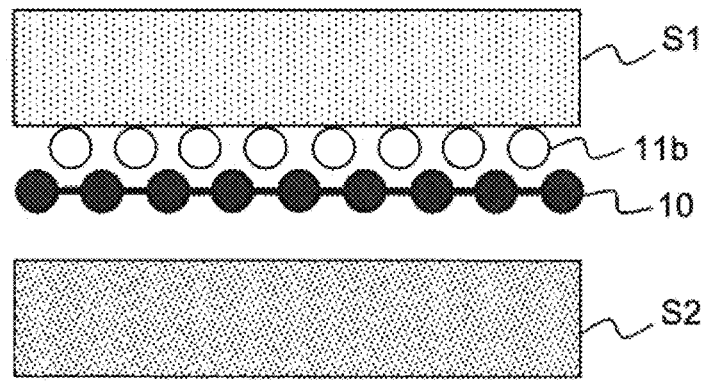

This opens the way to direct bonding to another so-called second substrate, as shown in FIG. 2c which illustrates the addition of the first substrate $S_1$/intermediate layer 11b/graphene 10, to a second substrate $S_2$.

Specifically, what makes it impossible, in the prior art, to transfer graphene directly from a first substrate to a second substrate is that the graphene adheres more strongly to the first substrate than to the second substrate.

Figure 2D:
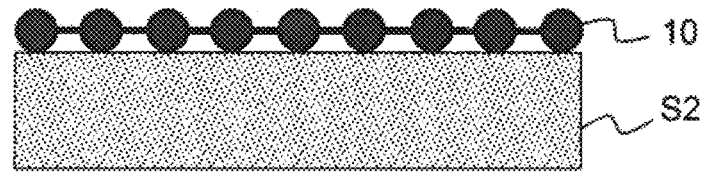

According to the invention, it becomes possible to remove the first substrate $S_1$ from the assembly formed beforehand: substrate $S_1$/gas layer 11b/graphene 10/substrate $S_2$, in order to obtain the assembly substrate $S_2$/graphene layer 10, as illustrated in FIG. 2d.

The presence of intermediate gas allows the prior-art situation to be reversed. This transfer operation may advantageously be assisted by a pressing operation plus optionally an operation of controlled heating of the samples during the pressing. Specifically, when the temperature increases the pressure of the intermediate gas does the same, thus pushing the graphene towards its new receiver substrate.

Since the exfoliating process of the invention comprises an operation of low-energy implantation through the graphene, it requires plasmas that produce light ions of small dimensions (capable of passing through the hexagons of the graphene) to be used. Thus, the most advantageous plasma chemistries are ones that produce hydrogen or helium ions.

Helium has advantageously in addition an almost non-existent chemical reactivity, making it possible to ensure a high chemical stability with respect to the graphene and to the first substrates on which the graphene may be produced.

The ion-implantation operation may in particular be carried out using an inductively coupled ICP reactor.

In a high-density reactor of the ICP type, the flux of these ions is perfectly controlled by the injected power and the sought-after energy range (10-60 eV) is easily accessible. The processing time may be adjusted so as to generate an intermediate gas pressure that is sufficient to "debond" the graphene of the first substrate but that is not too high in order to prevent the risk of complete debonding of the graphene. This time depends on the ion flux used i.e. on the ICP power.

The same operating technique may also be used to etch either one or more than one atomic layers from a set of N atomic layers of graphene: in this case it is enough to allow the process to continue until lift-off of the top layer of graphene, which will then be destroyed in the plasma and pumped out of the reactor.

Example of an Exfoliating Process According to the Invention

A first substrate made of copper on which graphene has been deposited by CVD is placed in a reactor using a high-density plasma of $H_2$ or preferably He.

The operating conditions are the following:
a gas flow rate: 10 to 1000 sccm;
a pressure: 1 mtorr to 500 mtorr;
an ICP power: 50 to 2000 W.
a bias-generating power of 0 to 200 W.

The bias power P is used to accelerate the ions and allow their energy to be controlled by the relationship $P=V*I$ where V is voltage (i.e. the energy of the ions) and I the current (i.e. the flux of ions). If the ICP power is high (2000 W) the current I is high and a high bias power (200 W) is necessary to achieve 60 eV of energy. In contrast, at low ICP powers (50 W), I is low and even a low P may suffice to reach this energy limit.

According to the process of the invention, He+ ions of 10 to 60 eV energy are thus produced allowing the first substrate and the graphene formed beforehand on the surface of said first substrate to be irradiated therewith.

The duration of the treatment is adjusted semi-empirically because it depends directly on the ion flux at the substrate.

The plasma is thus used to implant He+ ions between the graphene and copper. To do this, the graphene-on-copper substrate obtained by CVD is placed directly on a biasable substrate holder of the plasma reactor.

By virtue of the plasma, an intermediate gas layer then forms that does not leak because the graphene is perfectly impermeable to helium and hydrogen.

The substrate thus processed may then be taken out of the plasma reactor and placed directly in contact with the new receiver substrate of the graphene (no polymer is necessary).

Depending on the implanted amount of He ions, it is possible either to perform a direct transfer (stronger attraction to the new substrate than to the copper) or a transfer requiring pressing and/or heating, the latter allowing the pressure of the intermediate He gas to be made to increase.

Generally, it is also possible to carry out the exfoliating process of the present invention, described in the above process, with an irradiation operation carried out through a mask in order to define graphene patterns or even to thin a sample of multilayer graphene. In this case, the duration of the plasma exposure is simply extended until one or more top graphene layers lift off, which layers will then be destroyed in the plasma.

The invention claimed is:

1. A process for exfoliating graphene, comprising a step of irradiating a first substrate comprising graphene on its surface to weaken bonds between said graphene and said first substrate, with a helium or hydrogen plasma containing ions of energy comprised between 10 and 60 eV.

2. The process as claimed in claim 1, wherein the helium or hydrogen plasma contains ions of energy comprised between 15 and 30 eV.

3. The process as claimed in claim 1, wherein the first substrate is conductive or semiconductor.

4. The process as claimed in claim 3, wherein the substrate is copper or nickel or platinum.

5. The process as claimed in claim 3, wherein the first substrate is silicon carbide.

6. The process as claimed in claim 1, wherein the irradiating step is carried out with an inductively coupled plasma reactor.

7. The process as claimed in claim 6, using a hydrogen or helium gas flow rate comprised between 10 and 1000 sccm, a pressure comprised between 1 mtorr and 500 mtorr and a power comprised between 50 and 2000 W.

8. The process as claimed in claim 1, wherein the first substrate comprising multilayer graphene, the step of irradiating with a helium or hydrogen plasma containing ions of energy comprised between 10 and 60 eV removes at least the top layer of the multilayer graphene.

9. The process as claimed in claim 1, wherein the irradiation is carried out through a mask configured to create graphene patterns.

10. The process as claimed in claim 3, wherein, said substrate being conductive and possibly being copper, nickel or platinum, said process comprises a step of vapor deposition of at least one graphene layer on the surface of said first substrate.

11. The process as claimed in claim 3, wherein, said first substrate being a carbon-based semiconductor and possibly SiC, said process comprises a step of epitaxial deposition of at least one graphene layer on the surface of said first substrate.

12. A process for fabricating graphene on the surface of a second substrate, comprising the exfoliating process as claimed in claim 1 and comprising:
  a step of adding, to a second substrate, the first substrate comprising graphene on its surface, said adding step being subsequent to said irradiating step so as to form an assembly comprising graphene located between said first substrate and said second substrate; and
  removing said first substrate from said assembly.

13. The process as claimed in claim 12, furthermore comprising an operation of pressing said assembly.

14. The adding process as claimed in claim 12 and comprising a heating operation.

* * * * *